United States Patent [19]

Inoue et al.

[11] Patent Number: 5,766,765

[45] Date of Patent: Jun. 16, 1998

[54] GENERALLY FLAT MEMBER HAVING SMOOTH SURFACES AND MADE OF HIGHLY ORIENTED GRAPHITE

[75] Inventors: Takao Inoue, Hirakata; Junji Ikeda, Ikoma; Naomi Nishiki, Kyoto, all of Japan

[73] Assignee: Matsushita Electric Industrial Co., Ltd., Japan

[21] Appl. No.: 498,891

[22] Filed: Jul. 6, 1995

[30] Foreign Application Priority Data

Jul. 6, 1994 [JP] Japan .................... 6-154625

[51] Int. Cl.$^6$ .................................... B32B 27/00
[52] U.S. Cl. .......................... 428/408; 423/448
[58] Field of Search ............... 428/408; 423/448

[56] References Cited

U.S. PATENT DOCUMENTS

| | | | |
|---|---|---|---|
| 4,005,183 | 1/1977 | Singer | 423/448 |
| 4,194,027 | 3/1980 | Adams et al. | 427/249 |
| 4,749,514 | 6/1988 | Murakami et al. | 428/408 |
| 4,876,077 | 10/1989 | Murakami | 123/448 |
| 4,891,203 | 1/1990 | Singer et al. | 423/448 |
| 4,915,984 | 4/1990 | Murakami | 427/113 |
| 4,983,244 | 1/1991 | Murakami et al. | 423/448 |
| 5,618,615 | 4/1997 | Inoue et al. | 428/408 |

*Primary Examiner*—Archene Turner
*Attorney, Agent, or Firm*—Wenderoth, Lind & Ponack

[57] ABSTRACT

A functional member is supported by a support member in an apparatus and includes a generally flat element made of highly oriented graphite and having opposite smooth surfaces. The highly oriented graphite is of a laminar crystalline stricture made up of a plurality of crystalline layers and having planes of orientation aligned in a direction parallel to the opposite smooth surfaces of the generally flat element. The generally flat element is used as, for example, an upper cover for axially supporting an upper cylinder of a rotary head portion.

8 Claims, 8 Drawing Sheets

GENERALLY FLAT MEMBER HAVING SMOOTH SURFACES AND MADE OF HIGHLY ORIENTED GRAPHITE

BACKGROUND OF THE INVENTION

1. Field of the Invention

The present invention relates generally to a generally flat member having smooth surfaces such as, for example, an electrode, a radiation filter or the like and, more particularly, to a generally flat functional member having smooth surfaces and also having relatively high thermal and electrical conductivities.

2. Description of Related Art

A flat member having smooth surfaces is generally used at a location tending to suffer damage due to sliding engagement or contact thereof with another member. Such damage is generally caused by friction or heat. Because of this, a relatively hard material having a high thermal conductivity is generally used for the flat member having smooth surfaces.

Some of machines are provided with a thrust bearing for axially supporting a rotating element. The thrust bearing generally includes a flat member having smooth surfaces and made of, for example, high-carbon chrome bearing steel, iron- or copper-based oil-containing sintered material, or the like. In the case of a video tape recorder, a rotary head assembly is axially supported by a fluidic bearing employed as the thrust bearing to achieve a highly accurate rotational performance.

Japanese Patent Publication (examined) No. 59-45845 discloses a thrust bearing for use in a rotary head which includes a flange formed on an upper end of a rotary shaft and having microgrooves and a herringbone formed thereon. This bearing also includes a lubricating fluid enclosed between the rotary shaft and the rotary head so that the rotary head may be appropriately supported both radially and axially by a pressure which spiral grooves constituting a radial bearing generate and by a pressure which the microgrooves and herringbone constituting the thrust bearing generate during rotation of the rotary head.

On the other hand, a scroll compressor is employed in, for example, an air conditioner. The scroll compressor includes a stationary scroll member having a stationary end plate and a stationary scroll wrap protruding axially from the stationary end plate, and an orbiting scroll member having an orbiting end plate and an orbiting scroll wrap protruding axially from the orbiting end plate. The stationary and orbiting scroll wraps engage with each other to define a plurality of volume-variable, sealed working pockets therebetween. The scroll compressor also includes a main shaft for driving the orbiting scroll member, a bearing frame for supporting the main shaft and the orbiting scroll member, and an electric motor for driving the main shaft. When in use, the electric motor drives the drive shaft which in turn drives the orbiting scroll member to undergo an orbiting motion relative to the stationary scroll member so that refrigerant trapped into each working pocket experiences a decrease in volume and an increase in pressure until it is discharged from the compressor. In order to axially and radially support the main shaft and the orbiting scroll member, various thrust and radial bearings are provided in the compressor.

Furthermore, an electrode for use in a plasma-etching apparatus is a generally flat member having smooth surfaces. A reactive plasma-etching apparatus generally comprises a vacuum vessel and upper and lower electrodes both accommodated in the vacuum vessel so as to extend in parallel to each other. A high-frequency voltage is applied to one of the upper and lower electrodes on which an object to be treated is placed. Each electrode is made of material having smooth surfaces such as, for example, anodized rigid aluminum or the like. In this plasma-etching apparatus, the electrode on which the object is placed has a negative potential due to a difference in mobility between electrons and ions and, also, due to a difference in the effective electrode area between the two electrodes, while the potential in a plasma becomes slightly positive due to diffusion of the electrons As a result, a cathode fall region containing dominantly ions and neutrons is formed on the upper surface of the object, and active ions are incident on the object from a direction generally perpendicular thereto, thus giving rise to a physical sputtering effect which in turn causes etching.

A generally flat member having smooth surfaces is also used on one end of an orifice member of a plasma-arc welding torch. Such a flat member is generally formed by coating the one end of the orifice member with smooth ceramic or by depositing a high-melting metallic layer on an inner surface and an end surface of the orifice member. The smooth flat member is intended to prevent generation of a double arc which excessively consumes the orifice member.

A generally flat member having smooth surfaces and made of sapphire, beryllium or the like is used for an optical window mounted on a vacuum device. The optical window allows a user to check, for example, an instrument accommodated in the vacuum device or allows an X-ray or a laser beam to be introduced into the vacuum device therethrough for measurement or control of fine operation of the instrument.

As discussed hereinabove, generally flat functional members having smooth surfaces are utilized at specific locations of a variety of apparatus.

In order to obtain a generally flat member having smooth surfaces, it is necessary to first cut an appropriate material into a desired configuration and subsequently polish it. Such machining processes are important for the generally flat member to have desired smooth surfaces, but increases the manufacturing cost thereof.

When the generally flat member having smooth surfaces changes in shape due to wear or damage thereof, it is necessary to replace it with a new one. Such replacement is relatively time-consuming and requires disassembly of the apparatus to remove the wasted member therefrom and attach a new member thereto.

SUMMARY OF THE INVENTION

The present invention has been developed to overcome the above-described disadvantages.

It is accordingly an objective of the present invention to provide a generally flat functional member having smooth surfaces and a long duration of life to extend the cycle of replacement thereof.

Another objective of the present invention is to provide the generally flat functional member of the above-described type which is simple in construction and can be readily manufactured at a low cost.

In accomplishing the above and other objectives, the functional member according to the present invention is supported by a support member in an apparatus and comprises a generally flat element made of highly oriented graphite and having opposite smooth surfaces, said highly oriented graphite being of a laminar crystalline structure made up of a plurality of crystalline layers and having planes of orientation aligned in a direction parallel to the opposite smooth surfaces of the generally flat element.

Preferably, the graphite employable in the practice of the present invention has a FWHM-value of not greater than 20 degrees.

Conveniently, the generally flat element is employed as one of a bearing member for supporting a rotary shaft, a sliding member held in sliding contact with a movable member, an electrode for use in a plasma-etching apparatus, a protective member mounted on an orifice member of a plasma-arc welding torch, and an optical window member mounted on a vacuum vessel to introduce radiation therethrough.

Preferably, the graphite is obtained by calcining a plurality of sheets of a polymer resin and each of the crystalline layers is readily peelable.

The generally flat element may be a composite obtained by first pulverizing the graphite so that each particle has an elongated configuration of a high aspect ratio and by subsequently mixing pulverized graphite with one of solvent and cementing material and with one of a metallic binder, an inorganic binder, and an organic binder.

According to the present invention, because the generally flat element has opposite smooth surfaces without any machining processes, the manufacturing cost thereof is reduced.

Where the FWHM-value of the graphite is not greater than 20 degrees, the orientation of graphite is highly enhanced and, also, the surface smoothness is enhanced.

Where the generally flat element is used as one of the bearing member, sliding member, electrode, protective member, and optical window member all referred to above, the manufacturing cost of these members is reduced.

Moreover, where the graphite is obtained by calcining a plurality of sheets of a polymer resin and each of the crystalline layers is readily peelable and if the generally flat element wears or is damaged, a new smooth surface is readily obtained merely by peeling a surface layer without replacement of the generally flat member, thereby extending the duration of life thereof.

Again, where the generally flat element is a composite obtained by first pulverizing the graphite so that each particle has an elongated configuration of a high aspect ratio and by subsequently mixing pulverized graphite with one of solvent and cementing material and with one of a metallic binder, an inorganic binder, and an organic binder, various molded products of an arbitrary shape can be obtained at a low cost.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
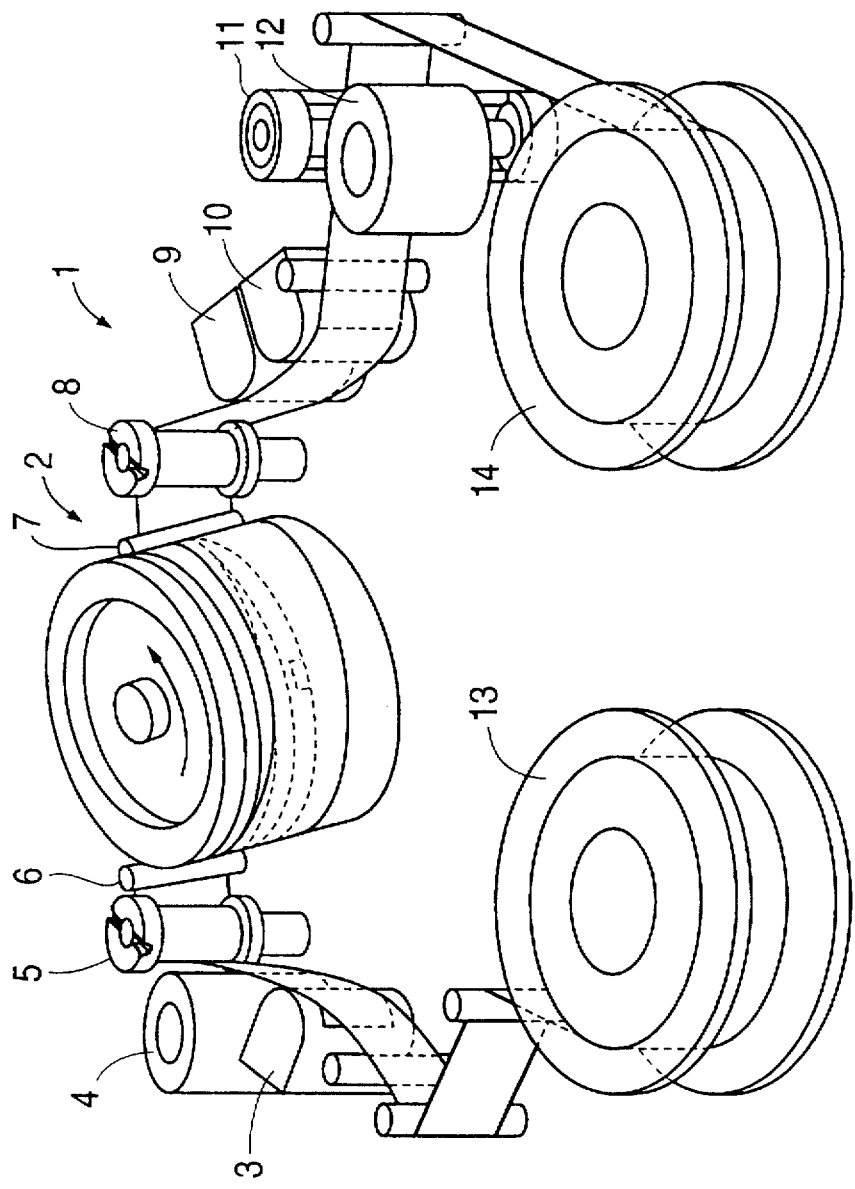
FIG. 1 is a perspective view of a tape drive mechanism for use in a video tape recorder to which a functional member with smooth surfaces of the present invention is applied.

Referring now to the drawings, there is shown in FIG. 1 a tape drive mechanism 1 for use in a video tape recorder to which a generally flat functional member with smooth surfaces of the present invention is applied. The tape drive mechanism 1 comprises an inclined rotary head portion 2 for recording and reproducing an image signal on and from a tape, a full-width erase head 3 for erasing an image signal recorded on the tape, an impedance roller 4 for preventing vertical vibration of the tape, and a pair of guide posts 5 and 6 for winding the tape slantwise around a portion of the rotary head portion 2. The full-width erase head 3, the impedance roller 4, and the pair of guide posts 5 and 6 are disposed in this order upstream of the rotary head portion 2 in a direction of travel of the tape.

A pair of guide posts 7 and 8 for restoring the tape wound slantwise around the rotary head portion 2, a voice erase head 9, a voice control head 10, and a capstan 11 and a pinch roller 12 opposed to each other for stabilizing the travel of the tape are disposed in this order downstream of the rotary head portion 2 in the direction of travel of the tape.

During recording, a length of tape wound around a supply reel 13 is fed out therefrom towards the full-width erase head 3 which in turn erases image data recorded on the tape, and the rotary head portion 2 records new image data on the tape until the tape is wound around a take-up reel 14. During reproduction, the rotary head portion 2 reproduces the image data recorded on the tape.

Figure 2:
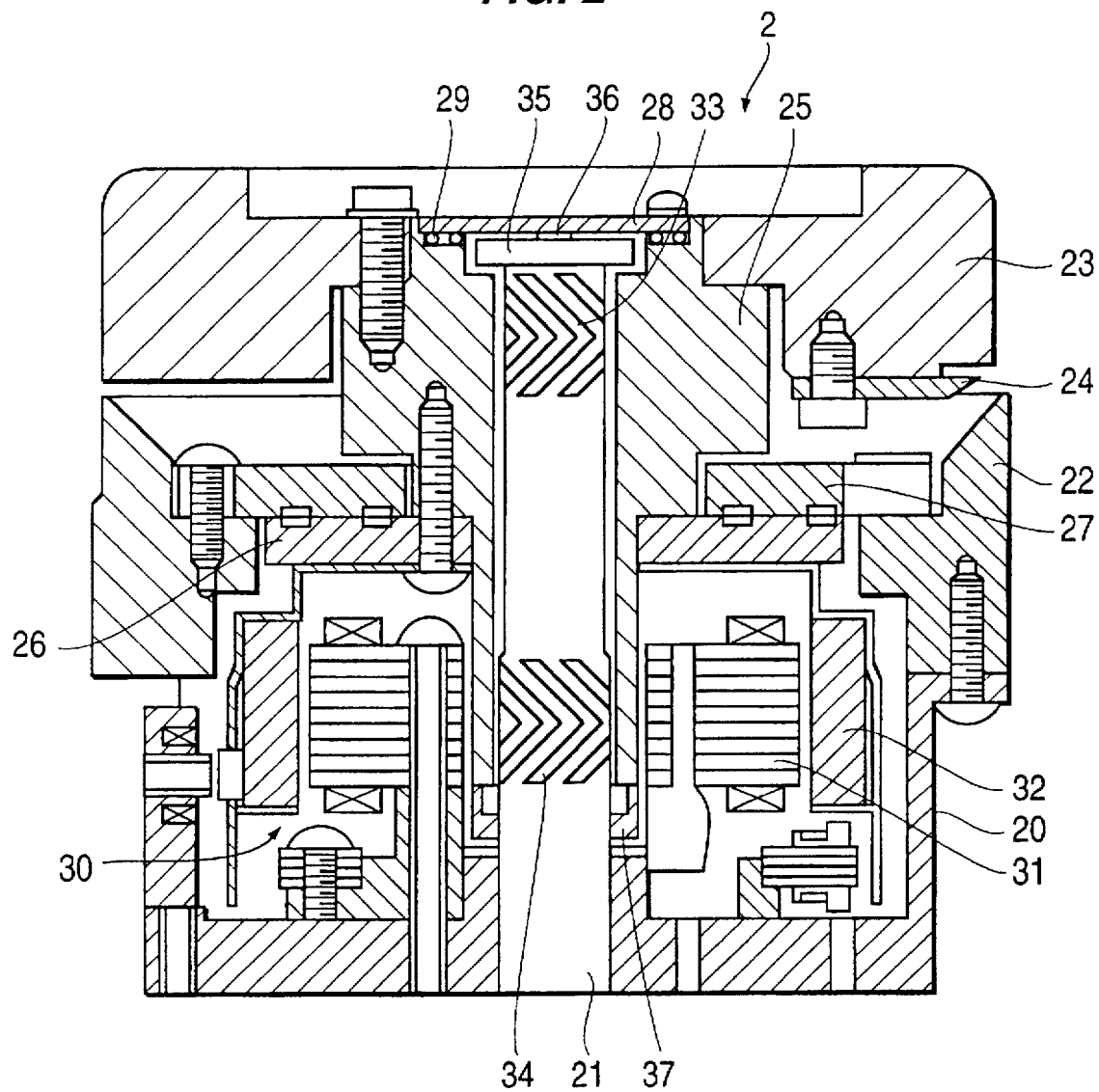
FIG. 2 is a vertical sectional view of a rotary head portion mounted in the tape drive mechanism of FIG. 1.

As shown in FIG. 2, the rotary head portion 2 comprises a lower housing 20, a center shaft 21 secured to the lower housing 20, a lower cylinder 22 fixedly mounted on the lower housing 20, an upper cylinder 23 rotatably mounted on the center shaft 21 via a rotary sleeve 25, and a head 24 secured to the upper cylinder 23. A rotary transformer 26 is secured to the rotary sleeve 25, while a stationary transformer 27 is secured to the lower cylinder 22 so as to confront the rotary transformer 26 in order to transmit a signal recorded by the head 24 from the rotary transformer 26 to the stationary transformer 27 without contact.

The lower housing 20 accommodates a direct drive motor 30 which comprises a stator 31 secured to the lower housing 20 and a magnetic rotor 31 secured to the rotary sleeve 25 via the rotary transformer 26.

The center shaft 21 has upper and lower bearings 33 and 34 formed thereon and spaced away from each other longitudinally thereof. These bearings 33 and 34 each have a plurality of spiral grooves defined therein and are classified into one kind of non-round bearings. The center shaft 21 also has a flange 35 integrally formed therewith or otherwise rigidly secured thereto on an upper end thereof. The flange 35 acts to prevent an axial movement of the rotary sleeve 25. To this end, the flange 35 has microgrooves 36 defined therein on a central portion of the upper surface thereof, while a generally flat upper cover 28 is secured to an upper end of the rotary sleeve 25 via an oil seal 29. The flange 35 and the upper cover 28 constitute a thrust bearing. Space delimited by the outer surface of the center shaft 21 and inner surfaces of the rotary sleeve 25 and the upper cover 28 is filled with magnetic fluid employed as a lubricant. The rotary sleeve 25 is provided at its lower open end with a magnetic seal 37 necessary to prevent leakage of the magnetic fluid.

The upper cover 28 is made of highly oriented graphite, which is obtained by calcining a polymer resin such as, for example, polyimide at a temperature of about 3,000° C. The graphite used to form the upper cover 28 is of a laminar crystalline structure made up of a plurality of crystalline layers and having planes of orientation aligned in a direction parallel to upper and lower surfaces of the upper cover 28, each of said crystalline layers being readily peelable and having opposite smooth surfaces. Accordingly, if the lower surface of the upper cover 28 confronting the microgrooves 36 of the flange 35 wears due to deterioration with age, a new smooth surface is exposed merely by peeling the wear surface layer upon removal of the upper cover 28 from the rotary sleeve 25. Partly for this reason and partly because the material of the upper cover 28 has a high modulus of elasticity, the upper cover 28 can have a relatively long duration of life, making it possible to extend the cycle of replacement of the upper cover 28.

It is to be noted here that although in the above-described embodiment the entire upper cover 28 is made of highly oriented graphite, only a portion of the upper cover 28 confronting the microgrooves 36 may be formed of highly oriented graphite. Also, the rotary sleeve 25 may have a ring-shaped graphite material formed thereon at a portion thereof Confronting the lower surface of the flange 35.

Figure 3:
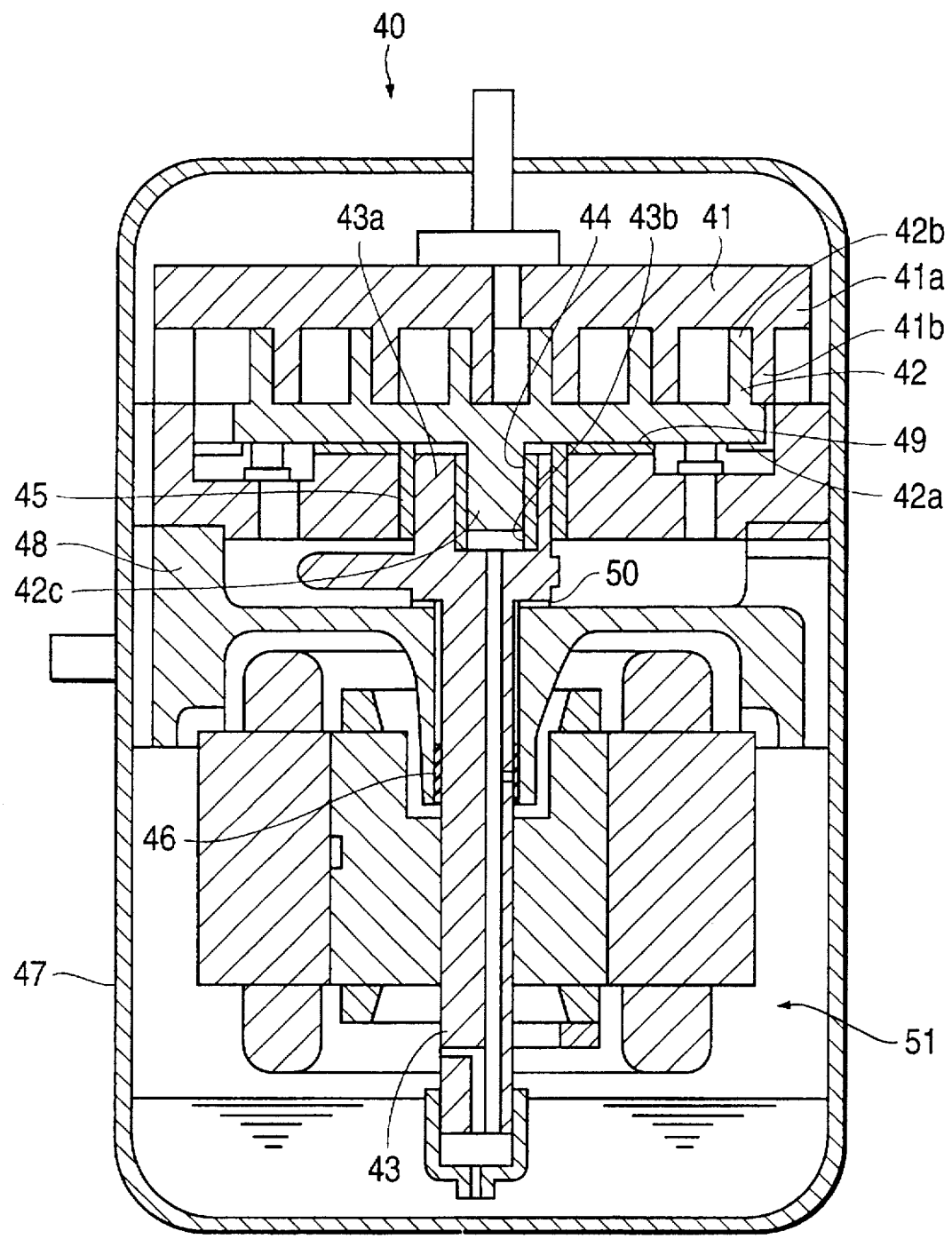
FIG. 3 is a vertical sectional view of a scroll compressor accommodating the functional member of the present invention.
Figure 4A:
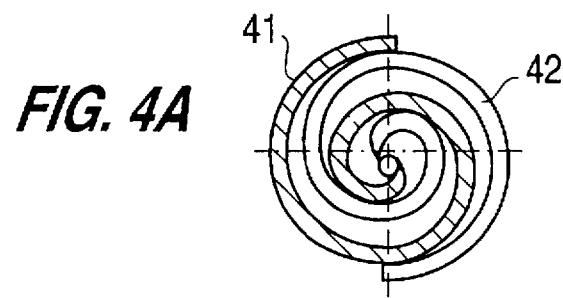
FIGS. 4A, 4B, 4C, and 4D are schematic views of stationary and orbiting scroll members operatively accommodated in the scroll compressor of FIG. 3 and being in engagement with each other, particularly indicating that the orbiting scroll member undergoes an orbiting motion relative to the stationary scroll member by 0°, 90°, 180°, and 270°, respectively.
Figure 4B:
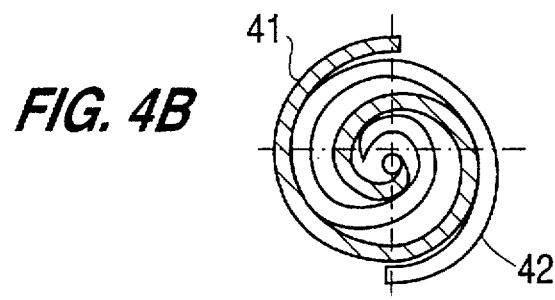
Figure 4C:
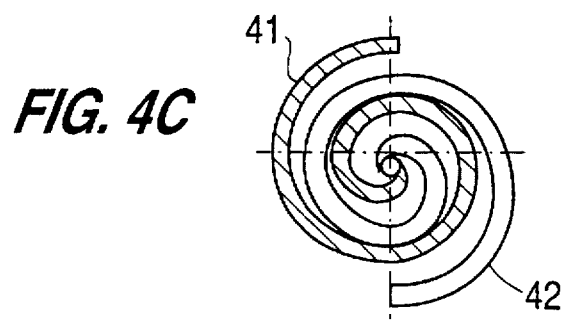
Figure 4D:
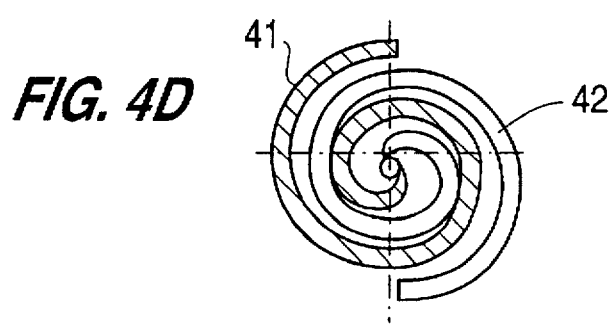

FIG. 3 depicts a scroll compressor 40 accommodating thrust bearings, to each of which a functional member with smooth surfaces of the present invention is applied.

The scroll compressor shown in FIG. 3 comprises a generally cylindrical compressor housing 47 and stationary and orbiting scroll members 41 and 42 both accommodated in the compressor housing 47. The stationary scroll member 41 includes a stationary end plate 41a and a stationary scroll wrap 41b protruding axially from a lower surface of the stationary end plate 41a, while the orbiting scroll member 42 similarly includes an orbiting end plate 42a and an orbiting scroll wrap 42b protruding axially from an upper surface of the orbiting end plate 42a. The stationary and orbiting scroll wraps 41b and 42b are shaped so as to represent respective involute curves, phases of which differ by 180°, and engage with each other to define a plurality of volume-variable, sealed working pockets therebetween. The orbiting end plate 42a is formed on a lower surface with a cylindrical boss 42c extending concentrically and transversely therefrom in a direction away from the orbiting scroll wrap 42b and rotatably carried by a scroll bearing 44. A drive shaft 43, driven by a motor 51 to drive the orbiting scroll member 42, has a large-diameter portion 43a integrally formed therewith on an upper end thereof and an eccentric hole 43b defined in the large-diameter portion 43a and receiving therein the scroll bearing 44.

An Oldham joint (not shown) is provided to prevent rotation of the orbiting scroll member 42 about its own axis while permitting the orbiting scroll member 42 to undergo an orbiting motion relative to the stationary scroll member 41.

The large-diameter portion 43a of the drive shaft 43 is rotatably carried by a first radial bearing 45, while an intermediate portion of the drive shaft 43 is rotatably carried by a second radial bearing 46. Both of the first and second radial bearings 45 and 46 are fixedly mounted on a stationary frame 48 rigidly secured to the compressor housing 47. The lower surface of the orbiting scroll member 42 is axially supported by a thrust bearing 49 fixedly mounted on the upper surface of the stationary frame 48. The thrust bearing 49 is made of highly oriented graphite shaped into a generally flat ring. The lower surface of the large-diameter portion 43a of the drive shaft 43 is axially supported by a thrust bearing 50 which is in turn carried by an intermediate portion of the stationary frame 48. This thrust bearing 50 is also made of highly oriented graphite shaped into a generally flat ring. The graphite used to form each of the thrust bearings 49 and 50 is of a laminar crystalline structure made up of a plurality of crystalline layers and having planes of orientation aligned in a direction parallel to upper and lower surfaces of each bearing 49 and 50, each of said crystalline layers being readily peelable and having opposite smooth surfaces.

It is to be noted here that radial bearings such as, for example, the first and second radial bearings 45 and 46 referred to above may be produced using a composite which is obtained by first pulverizing highly oriented graphite so that each particle has an elongated configuration of a high aspect ratio and by subsequently mixing the pulverized graphite with solvent or cementing material and with a metallic binder, an inorganic binder, or an organic binder.

The scroll compressor shown in FIG. 3 operates as follows.

When the drive shaft 43 is driven by the motor 51, the orbiting scroll member 42 undergoes an orbiting motion relative to the stationary scroll member 41, as shown in FIGS. 4A to 4D, without rotating about its own axis. The orbiting motion of the orbiting scroll member 42 introduces refrigerant into the sealed working pockets defined between the stationary and orbiting scroll wraps 41b and 42b and causes the sealed working pockets to move inwardly around the stationary and orbiting scroll wraps 41b and 42b towards a center discharge port defined in the stationary end plate 41a, accompanied by progressive reduction in volume thereof. Therefore, the refrigerant trapped into each working pocket experiences a decrease in volume and an increase in pressure as it approaches the center discharge port and is subsequently discharged through the center discharge port.

During the orbiting motion of the orbiting scroll member 42, the lower surface thereof is appropriately supported by the thrust bearing 49. Because the thrust bearing 49 is made of highly oriented graphite and, hence, has hard and smooth surfaces, it can be used for a long period of time without replacement. Also, because the graphite material has a self-lubricating property, the quantity of lubricant can be considerably reduced or no lubricant is required. The same is true for the thrust bearing 50. Furthermore, when these thrust bearings 49 and 50 wear, a new smooth surface can be obtained merely by peeling the wear surface layer.

Figure 5:
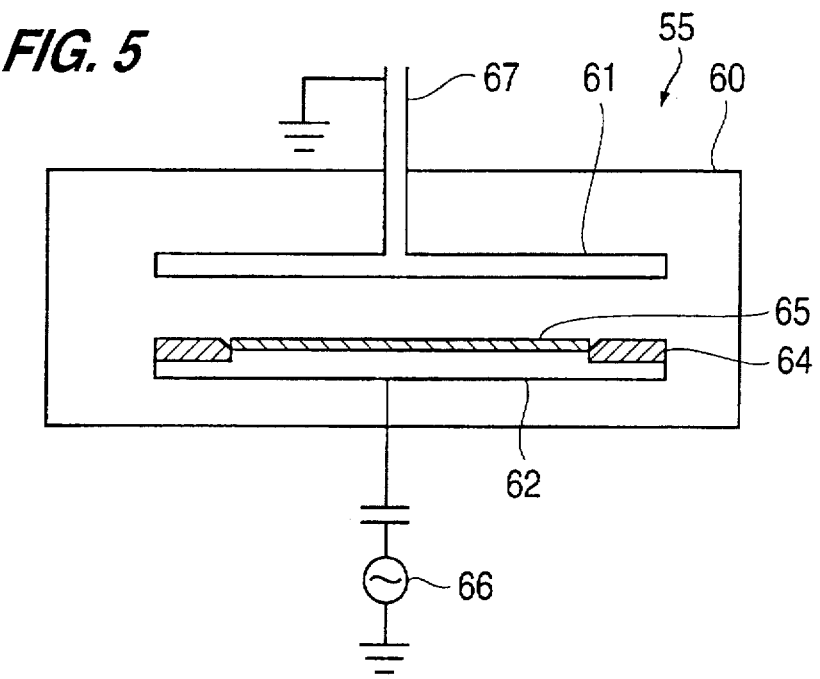
FIG. 5 is a schematic vertical sectional view of a plasma-etching apparatus accommodating the functional member of the present invention.

FIG. 5 depicts a plasma-etching apparatus 55 to which a functional member with smooth surfaces of the present invention is applied.

The plasma-etching apparatus 55 shown in FIG. 5 comprises a treating vessel 60 and generally flat upper and lower electrodes 61 and 62 accommodated in the treating vessel 60 so as to extend in parallel to each other.

Figure 6:
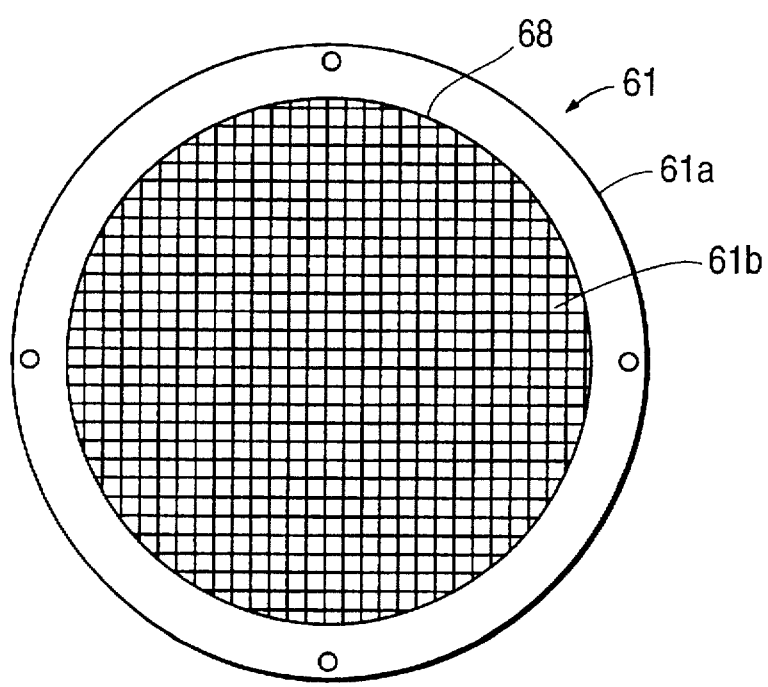
FIG. 6 is a top plan view of an upper electrode mounted in the plasma-etching apparatus of FIG. 5.

As shown in FIG. 6, the upper electrode 61 is made up of a first disc 61a and a second disc 61b coaxially bonded to each other. The first disc 61a has a diameter greater than that of the second disc 61b. Each of the first and second discs 61a and 61b is made of highly oriented graphite. The graphite used to form each of the first and second discs 61a and 61b is of a laminar crystalline structure made up of a plurality of crystalline layers and having planes of orientation aligned in a direction parallel to upper and lower surfaces of each disc 61a and 61b, each of said crystalline layers being readily peelable and having opposite smooth surfaces. The second disc 61b has a large number of round holes of a diameter of 0.3 mm defined therein on the lower surface thereof and regularly spaced in two directions perpendicular to each other. These holes can be formed by, for example, laser processing. An object 65 to be treated such as, for example, a wafer is held on the lower electrode 62 by, for example, electrostatic adsorption. The lower electrode 62 has a generally flat ring-shaped cover 64 placed thereon at an outer periphery thereof for concentrating an electric field on the object 65. The lower electrode 62 is connected to a high-frequency power source 66 so that a high-frequency voltage may be applied to the former from the latter. The upper electrode 61 is grounded. A gas pipe 67 is connected to the treating vessel 60 to introduce gas such as, for example, fluorine gas into the treating vessel 60.

It is to be noted here that although the upper electrode 61 has been described as being entirely made of graphite, it is sufficient if the upper electrode 61 has a surface layer made of highly oriented graphite.

It is also to be noted that the lower electrode 62 may be made of highly oriented graphite.

The plasma-etching apparatus referred to above operates as follows.

When a high-frequency voltage is applied to the lower electrode 62, the lower electrode 62 has a negative potential due to a difference in mobility between electrons and ions and, also, due to a difference in the effective electrode area between the upper and lower electrodes 61 and 62. On the other hand, the potential in a plasma becomes slightly positive due to diffusion of the electrons. As a result, a cathode fall region containing dominantly ions and neutrons is formed on the upper surface of the object 65, and active ions are incident on the object from a direction generally perpendicular thereto, thus giving rise to a physical sputtering effect which in turn causes etching.

At this moment, spatters produced as a result of etching of the object 65 tend to adhere to the upper and lower electrodes 61 and 62. In the practice of the present invention, however, because the upper electrode 61 is made of highly oriented graphite and has smooth surfaces, such spatters hardly adhere thereto, thus avoiding contamination of the object 65 which has been hitherto caused by adhesion of the spatters. If adhesion of the spatters or damage of the upper electrode 61 takes place, a new smooth surface can be obtained merely by peeling the surface layer. Such a simple operation extends the cycle of replacement of the upper electrode 61 and, hence, the upper electrode 61 can be used for a long period of time.

Figure 7:
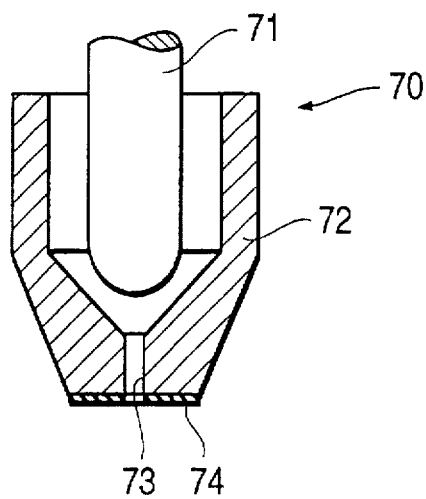
FIG. 7 is a vertical sectional view of a plasma-arc welding torch to which the functional member of the present invention is applied.

FIG. 7 depicts a torch 70 for use in plasma-arc welding.

The welding torch 70 comprises an electrode 71 for welding and an orifice member 72 encircling the electrode 71 so as to be spaced therefrom. The orifice member 72 has a lower free end having an orifice 73 defined therein for injecting a plasma. The lower surface of the lower free end of the orifice member 72 is covered with a generally flat protective member 74 made of highly oriented graphite. The graphite used to form the protective member 74 is of a laminar crystalline structure made up of a plurality of crystalline layers and having planes of orientation aligned in a direction parallel to upper and lower surfaces of the protective member 74, each of said crystalline layers being readily peelable and having opposite smooth surfaces. The protective member 74 is intended to prevent the orifice member 72 from being damaged by an impact force during welding and to avoid adhesion of spatters to the lower free end of the orifice member 72.

Prior to welding, the electrode 71 and the orifice member 72 are supplied with electric power to generate a so-called pilot arc and, almost at the same time, an appropriate working gas is supplied therebetween. Thereafter, the electrode 71 and an object to be welded (not shown) are supplied with electric power to generate a main arc therebetween. The main arc is appropriately throttled by the working gas and is injected from the orifice 73 of the orifice member 72 towards the object for plasma-arc welding thereof.

During welding, an undesired arc, with which the main arc forms a so-called double arc, is occasionally generated between the electrode 71 and the orifice member 72 or between the orifice member 72 and the object: The double arc excessively consumes the orifice member 72.

The protective member 74 made of highly oriented graphite is provided to avoid generation of such a double arc. Also, because the surface of the protective member 74 is very smooth, spatters hardly adhere thereto. Even if the protective member 74 wears to the extent of being unusable, it is not necessary to replace the orifice member 72. Because the surface layer of the protective member 74 is readily peelable, a new smooth surface can be obtained merely by peeling the surface layer. Accordingly, if the protective member 74 has a substantial thickness, a simple peeling operation can extend the cycle of replacement of the orifice member 72, resulting in a long duration of life of the welding torch 70.

Figure 8:
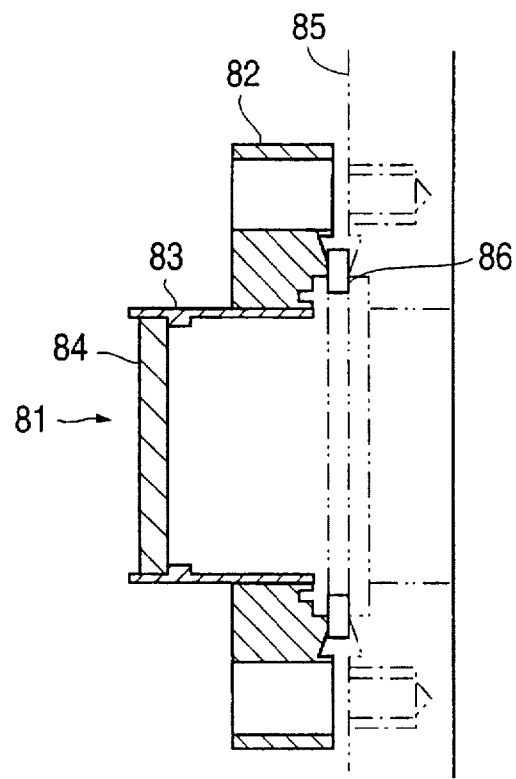
FIG. 8 is a fragmentary vertical sectional view of an optical window to which the functional member of the present invention is applied.

FIG. 8 depicts an optical window 81 of a vacuum vessel 85 made of a stainless alloy to which a functional member with smooth surfaces of the present invention is applied.

The optical window 81 shown in FIG. 8 comprises a ring-shaped flange 82 made of a stainless alloy and secured to the vacuum vessel 85 via a copper gasket 86, a generally cylindrical sleeve 83 made of a stainless alloy and welded to the inner surface of the flange 82, and a generally flat disc-shaped window member 84 made of highly oriented graphite and welded to an open free end of the sleeve 83. Welding of the window member 84 to the sleeve 83 is carried out using a brazing material such as, for example, Kovar to hermetically seal the vacuum vessel.

The graphite used to form the window member 84 is of a laminar crystalline structure made up of a plurality of crystalline layers and having planes of orientation aligned in a direction parallel to upper and lower surfaces of the window member 84, each of said crystalline layers being readily peelable and having opposite smooth surfaces. Because of this, the window member 84 allows an X-ray or a laser beam to be readily transmitted therethrough without irregular reflection. Also, the window member 84 has a high resistance to heat. In addition, even if the inner or outer surface of the window member 84 is damaged, a new smooth surface can be exposed merely by peeling the damaged surface layer, thus making it possible to extend the cycle of replacement of the optical window 81.

Figure 11:
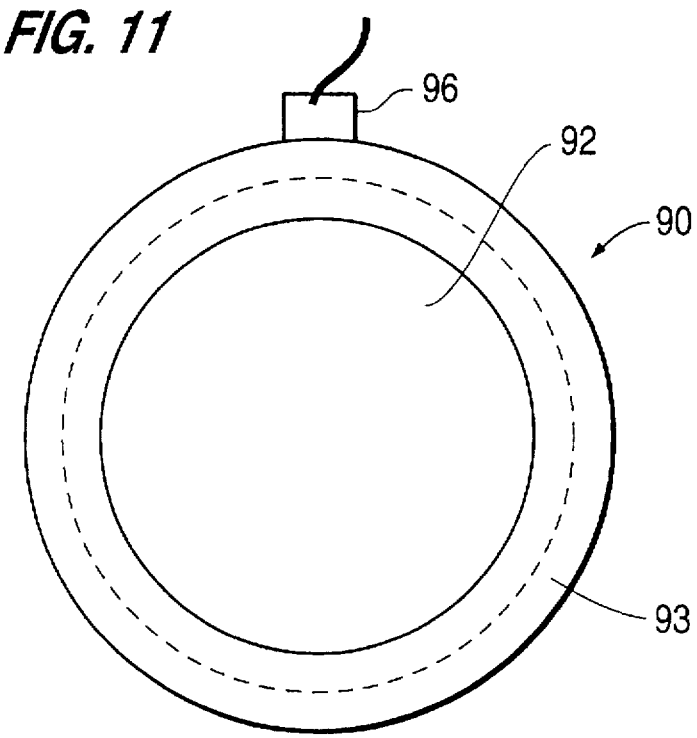
FIG. 11 is a front elevational view of an optical window to which the functional member of the present invention is applied.
Figure 12:
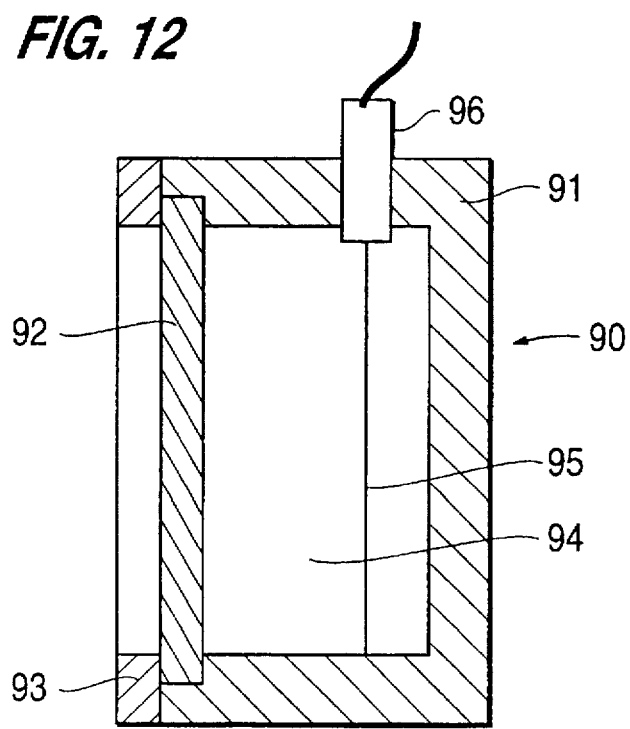
FIG. 12 is a vertical sectional view of the optical window of FIG. 11.

FIGS. 11 and 12 depict a gas-encapsulating X-ray detector 90 for use in a fluorescent X-ray analyzer with a functional member with smooth surfaces of the present invention applied to the X-ray detector 90.

The X-ray detector 90 comprises a generally cylindrical casing 91 having a closed end and an open end, a generally flat window member 92 made of highly oriented graphite and mounted on the open end of the casing 91 for allowing an X-ray to be transmitted therethrough, and a ring 93 secured to the open end of the casing 91 to retain the window member 92 between it and the casing 91. The graphite used to form the window member 92 is of substantially the same laminar crystalline structure as that used to form the optical window member 84 referred to above. The X-ray detector 90 encapsulates gas such as, for example, Ne, Ar, Kr, Xe or the like and accommodates a detection cable or sensor 95 extending generally vertically within a space 94 defined in the casing 91. The detection sensor 95 is connected to a signal terminal 96 secured to the casing 91.

The X-ray detector 90 of the above-described construction is capable of detecting, at a varying sensitivity, an X-ray irradiated from an element which vanes according to the kind of gas encapsulated therein. Because the window member 92 is made of highly oriented graphite, the area thereof through which the X-ray is transmitted can be increased to enhance the sensitivity, compared with a window member made of beryllium which is high in density and is therefore required to be thin.

A highly oriented graphite material employed as material for the functional member of the present invention may be a highly crystallized graphite having graphite crystals oriented in one direction. The highly crystallized graphite having a locking property (a FWHM-value measured with the use of an X-ray) not greater than 20 degrees is preferred. The graphite material may be the one obtained by laminating carbon atoms on a substrate by means of a chemical vapor deposition technique using hydrocarbon gas and then by annealing the substrate or may be in the form of a graphitized film of a specific polymer compound. However, the use of the graphitized film of the polymer compound is preferred because of its excellent surface smoothness. The locking property referred to in the specification is measured at a peak value of graphite (0002) lines with the use of a commercially available Rigaku Denki RU-200B X-ray diffractometer.

The polymer compound referred to above may be the one selected from the group consisting of polyoxadiazoles (PODs), polybenzthiazole (PBT), polybenzbisthiazole (PBBT), polybenzoxazole (PBO), polybenzbisoxazole (PBBO), various polyimides (PIs), various polyamides (PAs), polyphenylene benzimidazole (PBI), polyphenylene benzbisimidazole (PPBI), polythiazole (PT), and poly-paraphenylene vinylene (PPV).

The polyoxadiazoles referred to above include poly-paraphenylene-1,3,4-oxadiazole and its isomers.

The polyimides referred to above include aromatic polyimides expressed by the following general chemical formulas.

[Formula 1] (1)

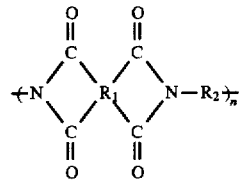

[Formula 2]

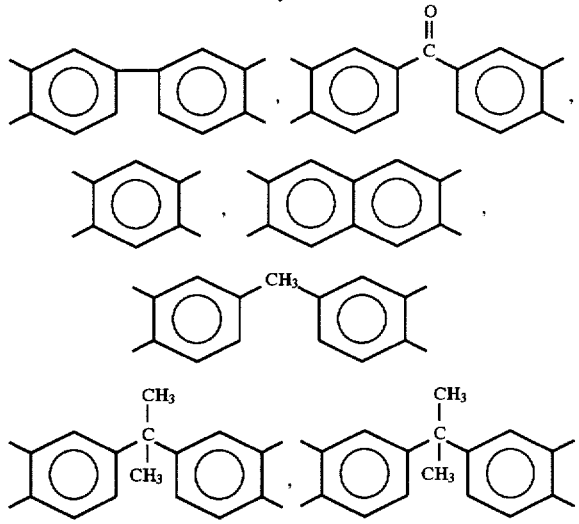

[Formula 3]

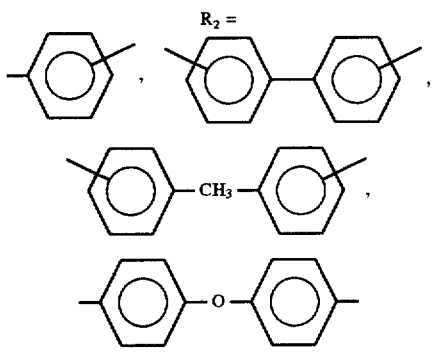

The polyamides referred to above include aromatic polyamides expressed by the following general chemical formula.

[Formula 4] (2)

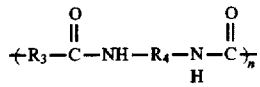

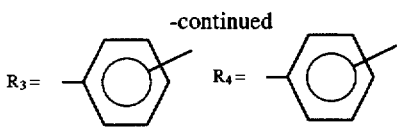

Any of the polyimides and the polyamides which may be employed in the present invention may not be limited to those expressed by the foregoing general formulas.

Any suitable calcining conditions may be employed to graphitize a film of the polymer compound, but calcination at a temperature sufficient to allow the film of the polymer compound to be heated to 2,000° C. or higher, preferably to a temperature region of about 3,000° C. is preferred to produce the highly oriented graphitized film. This calcination is generally carried out under the atmosphere of an inert gas. In order to suppress any possible influence which may be brought about by gases generated during the graphitization that is effected under a pressurized atmosphere during the calcination, it is preferred that the film of the polymer compound has a thickness not smaller than 100 μm. The pressure employed during the calcination may vary depending on the thickness of the film of the polymer compound, but is generally preferred to be within the range of 0.1 to 50 kg/cm². Where calcination is carried out at a maximum temperature not higher than 2,000° C., the resultant graphite would be hard and fragile. In this case, the calcination may be followed by rolling, if necessary. Graphitization of the film of the polymer compound may be carried out by cutting the film of the polymer compound to a desired size to provide a plurality of, for example, about 1,000, shaped sheets of the polymer compound, laminating the 1,000 shaped sheets one above the other to provide a laminar structure, loading the laminar structure into a calcining furnace to heat it to a temperature of 3,000° C. to initiate graphitization. After the calcination, the resultant graphite material may be rolled if so desired.

The resultant highly oriented graphite material may be in the form of a film, sheet or plate. By way of example, the highly oriented graphite material obtained by calcining the aromatic polyimide, has a specific gravity of 2.25 (as compared with 2.67 exhibited by aluminum), a thermal conductivity of 860 Kcal/m·h·°C. (2.5 times of that of copper and 4.4 times of that of aluminum) with respect to the direction of an A-B plane (the direction in which planes of orientation of crystals extend), an electrical conductivity of 25,000 S/cm with respect to the direction of the A-B plane, and a modulus of elasticity of 84,300 kgf/mm² with respect to the direction of the A-B plane.

Where the highly oriented graphite material is employed in the form of a film, a film of the polymer compound which is used as material therefor preferably has a thickness not greater than 400 μm and, more preferably within the range of 5 to 200 μm. If the film of the polymer compound exceeds the uppermost limit of 400 μm, the film will be disintegrated into pieces under the influence of gases generated internally of the film during the heat treatment and will hardly be utilized singly as a material for good electrodes.

However, even the graphite material in a disintegrated state may become a useful graphite material if mixed with a fluorine resin such as, for example, polytetrafluoroethylene known as Teflon to form a composite.

Figure 9:
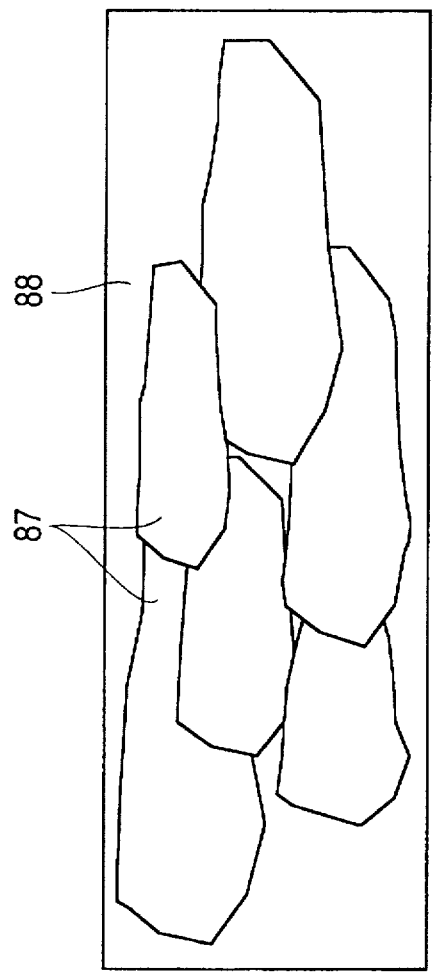
FIG. 9 is a schematic view, on an enlarged scale, of an extrusion-molded composite including highly oriented graphite.
Figure 10:
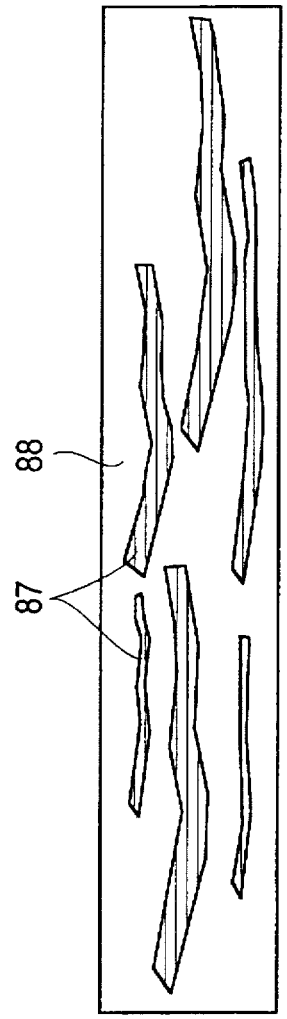
FIG. 10 is a schematic sectional view of the extrusion-molded composite of FIG. 9.

Also, the highly oriented graphite material discussed above may, after having been pulverized to form a scaly powder, be mixed with a polymer resin such as a fluorine resin and with a metallic binder of, for example, aluminum, an inorganic binder, or an organic binder to form a composite which may be subsequently used to form a heat sink, a sealing casing or a bearing. In the case of the composite, the weight-based ratio of the graphite material relative to the polymer resin is preferably within the range of 50:1 to 2:1. If this composite is extrusion-molded, carbon crystals 87 are oriented in a direction perpendicular to the direction of extrusion within a binder 88, as shown in FIGS. 9 and 10, and the modulus of elasticity becomes high in that direction. Also, coating the composite similarly results in alignment of the direction of orientation with the coating direction.

It is to be noted here that the functional member of the present invention is not limited to the above-described embodiments, but is applicable to all of bearing members for rotators, sliding members of movable elements, electrode members for use in plasma apparatus, orifice members of welding torches, and optical windows mounted on vacuum vessels.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A functional member for use in an apparatus, said functional member being supported by a support member in the apparatus and comprising a generally flat element made of highly oriented graphite and having opposite smooth surfaces, said highly oriented graphite being of a laminar crystalline structure made up of a plurality of crystalline layers and having planes of orientation aligned in a direction parallel to the opposite smooth surfaces of said generally flat element, said highly oriented graphite being obtained by calcining an aromatic polyimide, said graphite having a specific gravity of 2.25, a thermal conductivity of 860 Kcal/m·h·°C. with respect to the direction of an A-B plane, an electrical conductivity of 25,000 S/cm with respect to the direction of said A-B plane and a modulus of elasticity of 84,300 kgf/mm² with respect to the direction of said A-B plane, said A-B plane representing the direction in which the planes of orientation of the crystals extend in the highly oriented graphite.

2. The functional member according to claim 1, wherein said graphite has a FWHM-value of not greater than 20 degrees.

3. The functional member according to claim 2, wherein said graphite is obtained by calcining a plurality of sheets of a polymer resin and each of said crystalline layers is readily peelable.

4. The functional member according to claim 2, wherein said generally flat element is a composite obtained by first pulverizing said graphite so that each particle has an elongated configuration of a high aspect ratio and by subsequently mixing pulverized graphite with one of solvent and cementing material and with one of a metallic binder, an inorganic binder, and an organic binder.

5. The functional member according to claim 1, wherein said graphite is obtained by calcining a plurality of sheets of a polymer resin and each of said crystalline layers is readily peelable.

6. The functional member according to claim 1, wherein said generally flat element is a composite obtained by first pulverizing said graphite so that each particle has an elongated configuration of a high aspect ratio and by subsequently mixing pulverized graphite with one of solvent and cementing material and with one of a metallic binder, an inorganic binder, and an organic binder.

7. The functional member according to claim 5 wherein said polymer resin is selected from the group consisting of polyoxadiazoles, polybenzthiazoles, polybenzbisthiazoles, polybenzoxazoles, polybenzbisoxazoles, polyimides, polyamides, polyphenylene benzimidazoles, polyphenylene benzbisimidazoles, polythiazoles, and poly-paraphenylene vinylenes.

8. The functional member according to claim 7 wherein said polymer resin is a polyimide.

* * * * *